United States Patent
Zhang et al.

(10) Patent No.: US 11,997,727 B2
(45) Date of Patent: May 28, 2024

(54) ACCESS CONTROL METHOD AND USER EQUIPMENT

(71) Applicant: SHARP KABUSHIKI KAISHA, Sakai (JP)

(72) Inventors: Chongming Zhang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 332 days.

(21) Appl. No.: 17/626,079

(22) PCT Filed: Jul. 10, 2020

(86) PCT No.: PCT/CN2020/101306
§ 371 (c)(1),
(2) Date: Jan. 10, 2022

(87) PCT Pub. No.: WO2021/012966
PCT Pub. Date: Jan. 28, 2021

(65) Prior Publication Data
US 2022/0256621 A1    Aug. 11, 2022

(30) Foreign Application Priority Data
Jul. 19, 2019 (CN) .......... 201910658776.5

(51) Int. Cl.
*H04W 76/10* (2018.01)
*H04W 4/40* (2018.01)

(52) U.S. Cl.
CPC .............. *H04W 76/10* (2018.02); *H04W 4/40* (2018.02)

(58) Field of Classification Search
CPC ................. H04W 76/10; H04W 4/40
See application file for complete search history.

(56) References Cited

U.S. PATENT DOCUMENTS

| | | | |
|---|---|---|---|
| 2010/0296449 A1* | 11/2010 | Ishii ............... | H04L 1/1874 370/328 |
| 2012/0033554 A1* | 2/2012 | Shiva ............. | H04W 72/02 370/235 |
| 2016/0135095 A1 | 5/2016 | Wu | |
| 2016/0338092 A1 | 11/2016 | Agiwal et al. | |
| 2019/0053122 A1 | 2/2019 | Wu | |
| 2019/0297641 A1 | 9/2019 | Agiwal et al. | |
| 2020/0146046 A1 | 5/2020 | Agiwal et al. | |
| 2021/0112584 A1 | 4/2021 | Agiwal et al. | |

FOREIGN PATENT DOCUMENTS

| | | |
|---|---|---|
| CN | 105592549 A | 5/2016 |
| CN | 105917599 A | 8/2016 |
| CN | 109392193 A | 2/2019 |

* cited by examiner

Primary Examiner — Brenda H Pham
(74) Attorney, Agent, or Firm — ScienBiziP, P.C.

(57) ABSTRACT

The present invention provides an access control method in user equipment and user equipment that can efficiently and reliably establish a radio bearer for data transmission. The access control method comprises: determining a layer-2 destination ID according to information acquired from an upper layer; and establishing a radio bearer (RB) associated with the determined layer-2 destination ID.

2 Claims, 2 Drawing Sheets

ACCESS CONTROL METHOD AND USER EQUIPMENT

TECHNICAL FIELD

The present invention relates to the technical field of wireless communications. More specifically, the present invention relates to an access control method, a corresponding base station, and corresponding user equipment.

BACKGROUND

Vehicle to Everything (V2X) is a new generation of information and communication technology that connects vehicles with everything, in which V stands for vehicle, and X stands for any object that exchanges information with the vehicle, and X currently mainly includes vehicles, persons, traffic roadside infrastructure, and networks.

Currently, the types of V2X services performed by UE over an NR access technology-based PC5 interface can be unicast, groupcast, or broadcast. UE performing V2X services can be classified into transmitter UE and receiver UE. UE may be either transmitter UE or receiver UE. However, in a connection carrying a specific V2X service, transmitter UE and receiver UE are different UE.

In order to manage the QoS of the V2X service, the UE may perform transmission on the basis of a radio bearer (RB). As the transmitter UE, when an upper layer (which may be construed as a non-access stratum, or an application layer of the V2X service) of the UE instructs a lower layer (access stratum) to transmit a data packet carrying V2X service-related data for the first time, a radio bearer can be established for the transmission of the data. The RB establishment includes establishing an SDAP entity, a PDCP entity, and an RLC entity, and configuring related transmission parameters. After the RB is established, the data related to the specific V2X service can be transmitted through the RB.

For the receiver UE, correspondingly, it is also necessary to establish such an RB to process a received data packet. However, for a groupcast or broadcast service, when and how receiver UE establishes such an RB, how to maintain such an RB, and finally when to release the RB are all issues that need to be resolved.

SUMMARY OF INVENTION

The purpose of the present invention is to provide an access control method in user equipment and user equipment that can efficiently and reliably establish a radio bearer for data transmission. Moreover, the purpose of the present invention is to further provide an access control method in user equipment and user equipment that can well maintain an established radio bearer. Furthermore, the purpose of the present invention is to provide an access control method in user equipment and user equipment that can release an established radio bearer at an appropriate time.

According to a first aspect of the present invention, provided is an access control method in user equipment, the method comprising: upon receiving a destination ID associated with a radio bearer for data transmission and indicated by an upper layer, establishing a Packet Data Convergence Protocol (PDCP) entity and a Radio Link Control (RLC) entity according to a predefined configuration, wherein the predefined configuration comprises a PDCP sequence number size, an RLC sequence number size, and a logical channel number.

According to a second aspect of the present invention, provided is user equipment, comprising: a processor; and a memory storing instructions, wherein the instructions, when run by the processor, perform the foregoing access control method.

Effect of Invention

According to the access control method in user equipment and the user equipment of the present invention, a radio bearer for data transmission can be efficiently and reliably established; moreover, an established radio bearer can be well maintained; and furthermore, an established radio bearer can be released at an appropriate time.

BRIEF DESCRIPTION OF THE DRAWINGS

The above and other features of the present invention will be more apparent from the following detailed description in combination with the accompanying drawings, in which.

DETAILED DESCRIPTION

Figure 1:
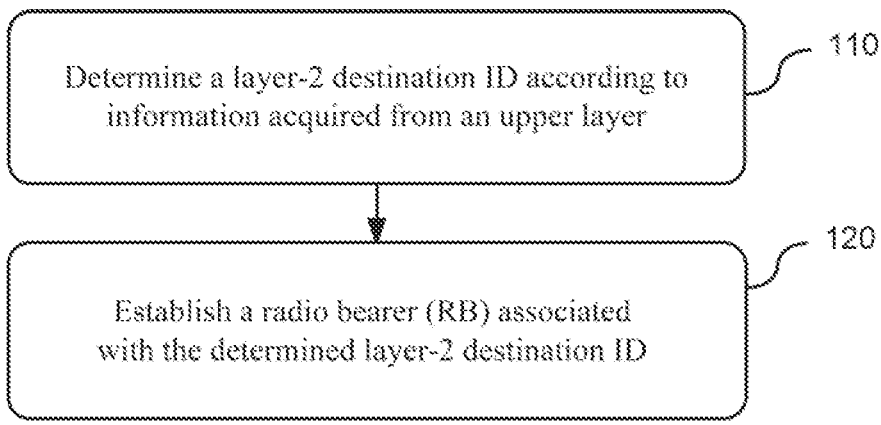
FIG. 1 shows a flowchart of an access control method in user equipment according to an embodiment of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
Sidelink
V2X: Vehicle to Everything
MAC: Medium Access Control
MAC CE: MAC Control Element
LCID: Logical Channel Identity
RB: Radio Bearer
RLC: Radio Link Control
PDCP: Packet Data Convergence Protocol
SDAP: Service Data Adaptation Protocol
PDU: Protocol Data Unit
SDU: Service Data Unit
PSID: Provider Service Identifier
ITS-AID: Intelligent Transport Systems Application Identifier
Layer-2 Destination ID: Layer-2 Destination Identity
Layer-2 Source ID: Layer-2 Source Identity In order to perform a V2X service, UE needs to know what service the UE needs to perform. An upper layer of the UE, such as an application layer of V2X, can provide the information to the UE. The information includes:

a V2X service list;

a PSID or an ITS-AID of a V2X application, and geographic region location information to which the application applies;

mapping between a service type and a V2X frequency, as well as applicable geographic region information, where, for example, for a certain V2X service, a PSID or ITS-AID thereof is X1, a V2X frequency corresponding to X1 is F1, and region information corresponding to X1 is D; then it indicates that service X1 needs to be performed at frequency F1 in region D;

mapping information between a layer-2 destination ID and a V2X service performed in a broadcast mode, where, for example, for a certain V2X service performed in a broadcast mode, a PSID or ITS-AID thereof is X2; then a layer-2 destination ID corresponding to X2 is Y2; and mapping information between a layer-2 destination ID and a V2X service performed in a groupcast mode, where, for example, for a certain V2X service performed in a groupcast mode, a PSID or ITS-AID thereof is X3; then a layer-2 destination ID corresponding to X3 is Y3.

It is meaningful to map a V2X service to a specific layer-2 destination ID, since the layer-2 destination ID can be used as an identifier for the UE to identify a specific V2X service at an access stratum.

If a layer-2 destination ID carried in a data packet received by the UE is included in a layer-2 destination ID list provided by the upper layer, it indicates that the data packet needs to be received by the UE; and if a layer-2 destination ID carried in a data packet received by the UE is not a layer-2 destination ID provided by the upper layer, the UE can discard the data packet.

In addition to providing a layer-2 destination ID by the upper layer, the UE may also obtain a layer-2 destination ID in other ways. For example, in a V2X service performed in a groupcast mode, an V2X application layer of the UE can provide group ID (group identifier) information, and then the UE converts this group ID into a layer-2 destination ID. For another example, a PSID/ITS-AID of the service may be mapped to a layer-2 destination ID on the basis of the aforementioned mapping relationship.

It can be seen that the upper layer of the UE can directly or indirectly provide a layer-2 destination ID to the access stratum. This procedure can be referred to as a procedure in which the EU determines a layer-2 destination ID. In this procedure, the layer-2 destination ID is passed to the access stratum of the receiver UE.

It should be noted that when a layer-2 destination ID is delivered to UE, the UE has a method to determine whether the UE itself is transmitter UE or receiver UE. For example, along with a given layer-2 destination ID, there is other information indicating whether the UE needs to perform reception or transmission. There may be two types of layer-2 destination ID lists obtained by the UE: one is a layer-2 destination ID list for transmission, and the other is a layer-2 destination ID list for reception. That is, the UE knows whether the UE is transmitter UE or receiver UE in an ongoing V2X service.

The solution discussed herein is provided on the basis that the UE knows itself as receiver UE.

The terms "associated", "corresponding", and "corresponding to" herein may be replaced with each other.

The two terms sidelink and V2X sidelink herein may be replaced with each other.

FIG. 1 shows a flowchart of an access control method in user equipment according to an embodiment of the present invention. As shown in FIG. 1, the access control method includes step S110 and step S120.

In step S110, the UE determines a layer-2 destination ID according to information acquired from an upper layer.

In step S120, the UE establishes an RB associated with the determined layer-2 destination ID.

According to the foregoing access control method, the UE establishes an RB associated with a determined layer-2 destination ID after determining the layer-2 destination ID, thereby efficiently and reliably establishing a radio bearer for data transmission.

Figure 2:
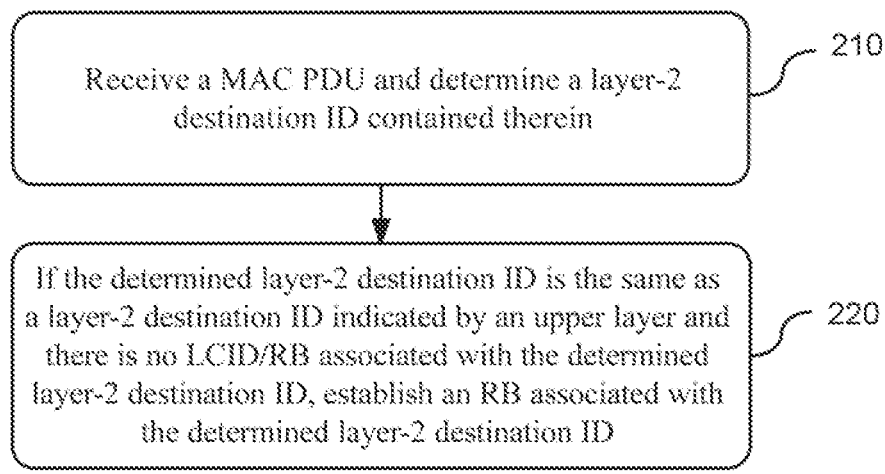
FIG. 2 shows a flowchart of another access control method in user equipment according to an embodiment of the present invention.

FIG. 2 shows a flowchart of another access control method in user equipment according to an embodiment of the present invention. As shown in FIG. 2, the access control method includes step S210 and step S220.

In step S210, the UE receives a MAC PDU and determines a layer-2 destination ID contained therein.

In step S220, if the determined layer-2 destination ID is the same as a layer-2 destination ID indicated by an upper layer and there is no LCID/RB associated with the determined layer-2 destination ID, the UE establishes an RB associated with the determined layer-2 destination ID.

According to the foregoing access control method, if a layer-2 destination ID contained in the MAC PDU is the same as the layer-2 destination ID indicated by the upper layer, and there is no LCID/RB associated with the layer-2 destination ID, the UE establishes an RB associated with the layer-2 destination ID, thereby efficiently and reliably establish a radio bearer for data transmission.

Several embodiments of the present invention are described in detail below.

Embodiment 1

When receiver UE determines a layer-2 destination ID, the receiver UE establishes a radio bearer. The radio bearer is bound to or associated with the determined layer-2 destination ID.

The binding or association mentioned herein means that when a MAC PDU is received, a layer-2 destination ID carried in the MAC PDU is the layer-2 destination ID determined by the UE; then a MAC SDU corresponding to this MAC PDU will be transmitted to the RB bound to the layer-2 destination ID to undergo processing. Specifically, the MAC SDU may be transmitted to an RLC entity, a PDCP entity, and an SDAP entity belonging to the RB to undergo processing.

One implementation of the above scheme may be:

when an upper layer of the UE determines a layer-2 destination ID, the upper layer indicates the layer-2 destination ID to a lower layer, which is preferably an RRC layer. The RRC layer initiates an RB establishment procedure on the basis of the indication. The purpose of the procedure is to establish an associated RB for the layer-2 destination ID, which may specifically include one or a plurality of the following operations:

1) Establishing a PDCP entity, where there can be only one PDCP entity established by default.

2) Establishing an RLC entity, where there can be only one RLC entity established by default.

3) Configuring the established PDCP entity and RLC entity by using pre-defined or pre-configured configuration information, or configuration information that is broadcast in system information.

For example, the pre-configuration information for the PDCP entity may include:
  setting of reordering timer t-Reordering duration;
  setting of discard timer discardTimer duration; and
  setting of PDCP SN (sequence number) size pdcp-SN-Size.

For example, the above parameters may be set as in the following table, in which it indicates that the PDCP SN size is set to 16 bits, and the duration of the reordering timer t-Reordering and the discard timer discardTimer are undefined, indicating that the parameters can be defined by the receiver UE itself.

| Name | Value |
| --- | --- |
| PDCP configuration | |
| pdcp-SN-Size | 16 |
| t-Reordering | Undefined |
| discardTimer | Undefined |

The configuration information for the RLC entity may include at least:
  configuration of a transmission mode of the RLC entity;
  configuration of an RLC SN size; and
  a logical channel ID.

For example, the above parameters may be set as in the following table, in which the value of the RLC configuration is UM, indicating that the mode of the RLC entity is configured as an unacknowledged mode (UM); the value of the RLC sequence number (SN) size is 6 bits; and the logical channel ID is undefined, indicating that the parameter is defined by the UE itself. It should be noted that although the LCID can be defined by the UE itself, once an RB is established, a LCID corresponding thereto is also determined and corresponds to the RB. Since the RB is associated with a certain layer-2 destination ID, it can be construed that the LCID is also associated with this layer-2 destination ID or it can be construed that an RB can be determined by a layer-2 destination ID and a LCID associated therewith.

| Name | Value |
| --- | --- |
| RLC configuration | UM |
| SN-field-Size | 6 |
| logicalChannelIdentity | Undefined |

Further optionally, if RLC/PDCP configuration information for a broadcast service is different from RLC/PDCP configuration information for a groupcast service, that is, the UE includes the RLC/PDCP configuration information for the broadcast service in a received system message and also includes the RLC/PDCP configuration information for the groupcast service in the received system message, then the UE uses corresponding configuration information to perform configuration according to whether a service corresponding to the layer-2 destination ID determined by the UE is of a broadcast type or a groupcast type.

Further, it is also possible that predefined RLC/PDCP configuration information is different from RLC/PDCP configuration information contained in system information received by a cell where the UE is located, and then the UE can always use the RLC/PDCP configuration information contained in the system information to configure the RLC entity/PDCP entity.

4) Associating the established RB with the determined layer-2 destination ID.
  5) Additionally, optionally, notifying the upper layer of the established RB and the layer-2 destination ID associated therewith.
  6) Additionally, optionally, associating the established RB with an SDAP entity. For the established RB, if there is already an SDAP entity associated with the layer-2 destination ID associated with the RB, then it is only necessary to associate the established RB with the SDAP entity; and
  if there is yet no SDAP entity associated with the layer-2 destination ID corresponding to the RB, then it is necessary to establish an SDAP entity.

Configuration information for the SDAP entity may also be broadcast by system information or be predefined.

Embodiment 2

On the basis of Embodiment 1, when an RB associated with a certain layer-2 destination ID is established, if UE receives a MAC PDU and a layer-2 destination ID carried in the MAC PDU is the same as the layer-2 destination ID associated with the RB, then a MAC SDU corresponding to the MAC PDU is transmitted to an RLC entity of the RB. Herein, the MAC SDU corresponding to the MAC PDU refers to one or a plurality of MAC SDUs contained in the MAC PDU and obtained after the MAC PDU passes through a disassembly and demultiplexing entity.

If only one MAC SDU is contained, then this MAC SDU can be transmitted to the RLC entity of the RB.

If a plurality of MAC SDUs are contained and LCIDs corresponding to these MAC SDUs are the same, then these MAC SDUs can be transmitted to the RLC entity of the RB.

If a plurality of MAC SDUs are contained and LCIDs corresponding to these SDUs are not the same, then the UE indicates this information to an upper layer, and the upper layer initiates RRC establishment of an RB on the basis of the information or the indication. A specific establishment procedure thereof is the same as that in Embodiment 1. Then the UE can choose to transmit one of the SDUs to a RLC entity of a previously established RB, and then transmit the other SDUs to RLC entities of newly established RBs.

For example, the UE establishes an association between RB0 and a certain layer-2 destination ID. When the UE receives a MAC PDU containing the layer-2 destination ID, if the MAC PDU contains two MAC SDUs, a LCID corresponding to SDU-1 is 3, and a LCID corresponding to SDU-2 is 5; then a MAC layer can transmit an indication to the RRC layer to initiate establishment of a new RB that is also associated with the layer-2 destination ID, which is referred to as RB1 herein. Then SDU-1 is transmitted to an RLC entity of RB0, and SDU-2 is transmitted to an RLC entity of RB1 to undergo processing.

Embodiment 3

In addition to a layer-2 destination ID, a MAC PDU further carries a layer-2 source ID. On the basis of Embodiment 1 or 2, if an established RB has not been associated with any layer-2 source ID, then UE can associate this RB with the layer-2 source ID upon receiving the MAC PDU.

Specifically, a MAC layer may indicate both the layer-2 source ID and the layer-2 destination ID to an RRC layer, and the RRC layer associates the corresponding RB with the layer-2 source ID. If this RB is already associated with a certain layer-2 source ID, and this layer-2 source ID is different from the layer-2 source ID carried in the MAC PDU, then the MAC layer informs the RRC layer of this information, and the RRC layer initiates establishment of a new RB. A specific establishment procedure is the same as that in Embodiment 1, with the difference lying in that the established RB is not only associated with the layer-2 destination ID carried in the MAC PDU, but also associated with the layer-2 source ID carried in the MAC PDU, and the newly established RB is associated with an SDAP entity associated with the previously established RB.

In Embodiment 1, it is mentioned that an established RB can be determined from a layer-2 destination ID and a LCID associated therewith. On the basis of the current embodiment, it can be further construed that an established RB can be determined from a layer-2 destination ID, a layer-2 source ID, and a LCID associated therewith.

Therefore, for a MAC PDU, which carries a layer-2 destination ID and a layer-2 source ID, and in which a MAC subheader corresponding to a certain MAC SDU contained in the MAC PDU carries a LCID, it can be uniquely determined, according to these three parameters, which RB can receive and process the received MAC SDU.

Embodiment 4

The difference between Embodiment 4 and Embodiment 1 is that RB establishment is initiated at a different time.

In Embodiment 1, when UE determines a layer-2 destination ID, establishment of an associated RB is initiated. In this embodiment, when the UE receives a MAC PDU, which carries a layer-2 destination ID that is the same as a layer-2 destination ID indicated by an upper layer, if the UE determines that no LCID/RB is associated with the layer-2 destination ID, then a MAC layer can indicate the information to an RRC layer; and the RRC layer initiates establishment of an associated RB on the basis of the information or the indication.

A specific establishment procedure may be the same as the establishment procedure in Embodiment 1. Additionally, optionally, in addition to being associated with the layer-2 destination ID carried in the MAC PDU, the established RB may also be associated with a layer-2 source ID carried in the MAC PDU. Additionally, optionally, the UE may configure a LCID of the established RB to have the same value as a LCID carried in a subheader corresponding to a MAC SDU contained in the MAC PDU, so that the established RB corresponds to a set of layer-2 destination ID, layer-2 source ID, and LCID.

Once the RB is established, in the following data reception procedure:
when the UE receives a MAC PDU, which carries a layer-2 destination ID that is the same as the layer-2 destination ID indicated by the upper layer, and there is a corresponding LCID/RB associated with the layer-2 destination ID, then a MAC SDU corresponding to the MAC PDU is transmitted to an RLC entity of a corresponding RB to undergo processing. The MAC SDU can be referred to as an RLC PDU after being transmitted to an RLC layer.

A first specific implementation may be as follows:
When the UE receives a MAC PDU, the UE first determines whether a layer-2 destination ID carried therein is the same as the layer-2 destination ID indicated by the upper layer;
if not, the UE discards the MAC PDU; if yes, the UE further determines whether there is a corresponding LCID/RB associated with the layer-2 destination ID.
If there is no corresponding LCID/RB associated with this layer-2 destination ID, then the UE can indicate this information to the upper layer. Based on this indication, the upper layer can initiate establishment of an RB associated with the layer-2 destination ID. For a specific establishment procedure, reference may be made to the RB establishment procedure in Embodiment 1.

If there is a corresponding RB associated with this layer-2 destination ID, then data carried by the MAC PDU can be transmitted to this RB or an RLC entity of the RB to undergo processing, and optionally, if there is a corresponding RB associated with this layer-2 destination ID, then it can be further determined which one of one or a plurality of RBs associated with the layer-2 destination ID has the same layer-2 source ID as a layer-2 source ID carried in this MAC PDU, or whether there is an RB associated with both the layer-2 source ID and the layer-2 destination ID carried in the MAC PDU.

If there is no such an RB, the UE can indicate this information to the upper layer. Based on the indication, the upper layer can initiate establishment of an RB, and the established RB is associated with both the layer-2 destination ID and the layer-2 source ID. For a specific establishment procedure, reference may be made to Embodiment 3.

If there is such an RB (one or a plurality), then it can be considered that there is an RB associated with both the layer-2 source ID and the layer-2 destination ID carried in this MAC PDU, and then the data carried in the MAC PDU can be transmitted to this RB or an RLC entity of the RB to undergo processing, and optionally, if there is such an RB, the UE can further determine among these RBs whether there is an RB whose LCID is the same as a LCID corresponding to a certain MAC SDU contained in the MAC PDU. The LCID corresponding to the MAC SDU may be in a subheader corresponding to the MAC SDU contained in the MAC PDU.

For an existing RB associated with both the layer-2 source ID and the layer-2 destination ID in the MAC PDU, a LCID thereof has been determined. In this case,
if there is such an RB among these RBs, that is, a LCID of this RB is the same as the LCID corresponding to the MAC SDU contained in the MAC PDU, then this MAC SDU can be transmitted to the RB or an RLC entity of the RB to undergo processing; and
if there is no such an RB, that is, although these RBs are associated with both the layer-2 source ID and the layer-2 destination ID carried in this MAC PDU, LCIDs configured for these RBs are not the same as the LCID corresponding to the MAC SDU contained in the MAC PDU, then the UE can indicate this information to the upper layer. Based on the indication, the upper layer can initiate establishment of an RB, and the established RB is associated with the layer-2 destination ID and is also associated with the layer-2 source ID, and a LCID configured for the RB has the same value as the LCID corresponding to this MAC SDU. For a specific establishment procedure, reference may be made to Embodiment 3. The RB or the RLC entity of the RB is subsequently used to process the corresponding MAC SDU.

A second specific implementation may be as follows:
When the UE receives a MAC PDU, the UE first determines whether a layer-2 destination ID carried therein is the same as the layer-2 destination ID indicated by the upper layer;
if not, the UE discards the MAC PDU; and if yes, the UE further determines whether there is a corresponding LCID/RB associated with the layer-2 destination ID and a layer-2 source ID contained in the MAC PDU.

If there is no corresponding LCID/RB associated with the layer-2 destination ID and the layer-2 source ID contained in the MAC PDU, then the UE can indicate this information to the upper layer. Based on the indication, the upper layer can initiate establishment of an RB associated with the layer-2 destination ID. For a specific establishment procedure, reference may be made to Embodiment 3.

If there is such an RB (one or a plurality), then processing can be performed according to the operations performed after it is determined that "there is an RB associated with both the layer-2 source ID and the layer-2 destination ID carried in the MAC PDU" in the first implementation.

Embodiment 5

On the basis of Embodiment 4, if LCIDs corresponding to SDUs contained in the MAC PDU are different, a MAC layer further needs to indicate to an upper layer the number of RBs that need to be established, and optionally, the value of a LCID corresponding to each RB. Herein, UE may set the LCIDs corresponding to RLC entities of these established RBs to be the same as the LCIDs corresponding to the SDUs contained in the MAC PDU.

For example, the MAC PDU contains SDU-1 and SDU-2, and LCIDs corresponding thereto are LCID-1 and LCID-2, respectively. Then an RRC layer establishes two RBs, referred to as RB0 and RB1, on the basis of an indication from a lower layer (MAC layer). A LCID value of an RLC entity of RB0 may be set to the value of LCID-1, and a LCID value of an RLC entity of RB1 may be set to the value of LCID-2. Therefore, the RLC entity of RB0 can process SDU-1, and the RLC entity of RB1 can process SDU-2.

If the UE subsequently receives a MAC PDU containing the layer-2 destination ID, an SDU contained therein whose corresponding LCID is LCID-1 is transmitted to RB0 to undergo processing, and an SDU contained therein whose corresponding LCID is LCID-2 is transmitted to RB1 to undergo processing.

Embodiment 6

On the basis of Embodiment 1 or 4, if configuration information of an RLC/PDCP entity is acquired by UE in system information broadcast by a cell, when the UE moves from one cell to another cell, the UE detects, in acquired system information, a change in the corresponding configuration information; then the UE needs to reestablish the corresponding RLC/PDCP entity, or reestablish a corresponding RB.

The reestablishment includes:
1) reestablishing an RLC entity, which may include discarding all RLC SDUs or RLC PDUs, and/or stopping and resetting all timers, and/or resetting variables to initial values thereof, etc.; and
2) reestablishing a PDCP entity, which may include stopping and resetting a t-Reordering timer, and/or transmitting all PDCP SDUs to an upper layer in ascending order, and/or resetting variables to initial values thereof, etc.

Embodiment 7

On the basis of embodiment 1 or 4, when an upper layer updates a list of layer-2 destination IDs, if an access stratum of UE, preferably, an RRC layer, determines that a previously determined layer-2 destination ID is no longer included in the updated list, a procedure of releasing a corresponding RB or RLC/PDCP entity is initiated.

It is also possible that after the upper layer updates a mapping relationship between V2X services and layer-2 destination IDs, if the access stratum of the UE determines that the previously determined layer-2 destination ID no longer exists or is no longer valid, a procedure of releasing the corresponding RB or RLC/PDCP entity and releasing an SDAP entity is initiated.

This release procedure may include one or a plurality of the following operations:
1) releasing the RLC entity, which may include discarding all RLC SDUs or RLC PDUs;
2) releasing the PDCP entity, which may include transmitting all PDCP SDUs to the upper layer in ascending order; and
3) releasing the SDAP entity.

Embodiment 8

After an RB is established (for example, the RB is established according to the method in Embodiment 1 or 4), UE may configure a timer for each established RB. This timer can be configured at an RLC layer. When the establishment of this RB or an RLC entity of this RB is completed, the timer is started. When an RLC entity of a certain RB receives data from a lower layer, such as a MAC SDU, the timer is restarted. When the timer expires, the RLC layer indicates this information to an upper layer, for example, to an RRC layer; based on the indication, the upper layer of the UE can initiate a procedure of releasing a corresponding RB or RLC/PDCP entity and releasing an SDAP entity. For a specific release procedure, reference may be made to Embodiment 7. In addition, if a reestablishment situation mentioned in Embodiment 6 occurs, the timer may also be restarted.

This timer may also be configured at a MAC layer. The MAC layer sets a timer for each logical channel. When there is data transmitted to a certain logical channel, a timer corresponding thereto is restarted. When the timer expires, the MAC layer indicates this information to an upper layer, for example, to the RRC layer; based on the indication, the upper layer of the UE can initiate a procedure of releasing a corresponding RB or RLC/PDCP entity and releasing an SDAP entity. For a specific release procedure, reference may be made to Embodiment 7. The "corresponding RB" herein refers to an RB for the logical channel, or an RB having the logical channel number.

Embodiment 9

After an RB is established (for example, the RB is established according to the method in Embodiment 1 or 4), UE may further configure a timer for each set of layer-2 source ID and layer-2 destination ID. This is different from Embodiment 8 in that there may be a plurality of RBs that are all associated with a set of layer-2 source ID and layer-2 destination ID. As long as received data is processed in these plurality of RBs, the timer can be restarted. When the timer expires, a procedure of releasing a corresponding RB or RLC/PDCP entity and releasing an SDAP entity can be initiated. For a specific release procedure, reference may be made to Embodiment 7. In addition, if a reestablishment situation mentioned in Embodiment 6 occurs, the timer may also be restarted.

Such a timer may be configured at an SDAP layer, and one such timer is configured for each SDAP entity. When the SDAP entity is established, the timer is started; and when the SDAP entity processes and receives data provided by a lower layer, the timer can be restarted. When the timer expires, the SDAP layer can indicate this information to an upper layer to initiate a procedure of releasing the corresponding RB or RLC/PDCP entity and releasing the SDAP entity. Herein, the "corresponding RBs" refer to all RBs associated with the set of layer-2 source ID and layer-2 destination ID.

Figure 3:
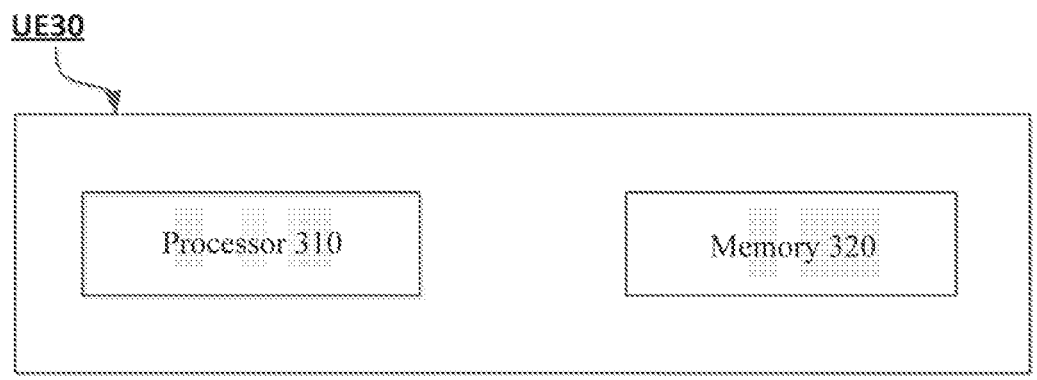
FIG. 3 is a block diagram of user equipment according to an embodiment of the present invention.

FIG. 3 shows a block diagram of user equipment (UE) 30 according to an embodiment of the present invention. As shown in FIG. 3, the UE 30 includes a processor 310 and a memory 320. The processor 310 may include, for example, a microprocessor, a microcontroller, an embedded processor, and the like. The memory 320 may include, for example, a volatile memory (for example, a random access memory (RAM)), a hard disk drive (HDD), a non-volatile memory (for example, a flash memory), or other memories. The memory 320 stores program instructions. When executed by the processor 310, the instructions can perform the foregoing access control method in user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. An access control method performed by user equipment, the method comprising:
   in a case that an upper layer indicates to a lower layer, which is an RRC layer, a specific destination for data transmission, establishing a Packet Data Convergence Protocol (PDCP) entity and a Radio Link Control (RLC) entity of a radio bearer for the data transmission which are configured according to a predefined configuration, wherein
   the predefined configuration comprises:
   a PDCP sequence number size;
   an RLC sequence number size; and
   a logical channel number.

2. User equipment, comprising:
   a processor; and
   a memory storing instructions,
   wherein the processor runs the instructions to:
   in a case that an upper layer indicates to a lower layer, which is an RRC layer, a specific destination for data transmission, establish a Packet Data Convergence Protocol (PDCP) entity and a Radio Link Control (RLC) entity of a radio bearer for the data transmission which are configured according to a predefined configuration, wherein
   the predefined configuration comprises:
   a PDCP sequence number size;
   an RLC sequence number field size; and
   a logical channel identity.

\* \* \* \* \*